Figure 1:
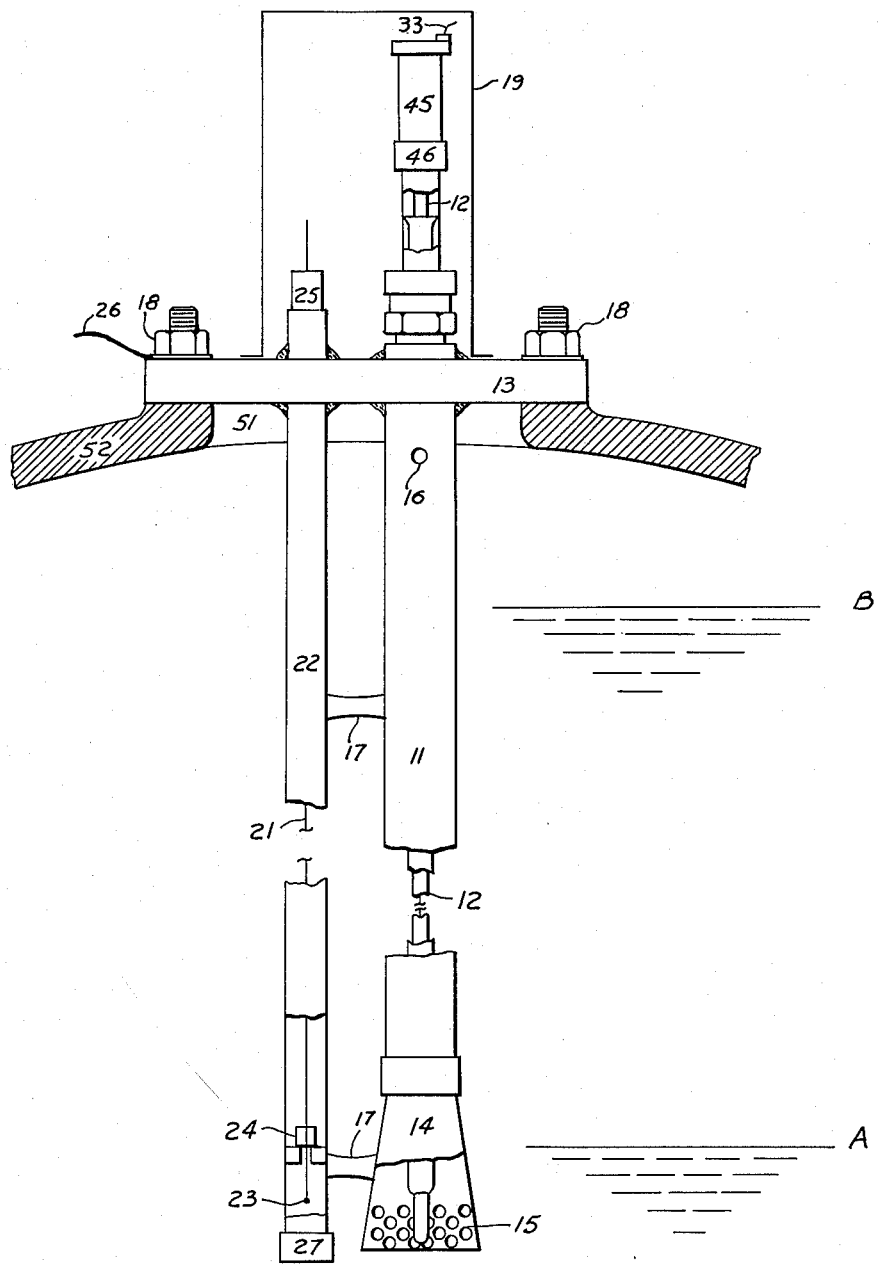

July 26, 1955  J. L. PFLASTERER  2,714,190
ELECTRODE ASSEMBLY
Filed March 10, 1954  3 Sheets-Sheet 1

INVENTOR.
JAMES L. PFLASTERER
BY Kenneth Swartwood
ATTORNEY

INVENTOR.
JAMES L. PFLASTERER
ATTORNEY

United States Patent Office 2,714,190
Patented July 26, 1955

2,714,190

ELECTRODE ASSEMBLY

James L. Pflasterer, Scott Township, Allegheny County, Pa., assignor to Ethyl Corporation, New York, N. Y., a corporation of Delaware Application March 10, 1954, Serial No. 415,362

4 Claims. (Cl. 324—32)

This invention relates to an assembly including an electrode for use in the analysis of non-ferrous alloy compositions. More specifically, the invention relates to apparatus comprising an improved and protected electrode assembly suitable for ready installation in apparatus for manufacture of fused alloys of non-ferrous metals.

United States Patent No. 2,665,412, Eding and Glassbrook, disclosed that fused non-ferrous alloys can be virtually instantaneously analyzed by inserting a reference metal specimen of alkali metal (within a vitreous chamber permeable to ions of said alkali metal) within a body of fused alloy and ascertaining the electromotive force existent or generated between the alloy to be analyzed and the reference metal specimen. It is shown in the Eding et al. patent that it is essential that the reference metal specimen be isolated from the surface of the said alloy, and it is shown therein that such isolation can be achieved by apparatus having certain particular features. More specifically, the envelope or capsule containing the reference metal specimen is isolated from the surface by means of a double walled chamber extending through the surface of the alloy, the interior wall being an extension of the capsule proper or part of the capsule, and the exterior wall being a barrier or insulating wall which electrically isolates the specimen from the surface.

The Eding et al. method is highly effective and quite workable. The method finds particular application in analysis of the alloys of lead and alkali metals. It has even been discovered that the Eding method may be applied in the manufacture and analysis of three component alloys wherein two components are alkali metals such as potassium and sodium, the third component being lead. The electromotive force generated and measured by electrical wires leading to the isolated alkali metal specimen and to the alloy being analyzed is of the order of several hundred millivolts. In order to ascertain on a quite sensitive scale and with consequent accuracy the composition of the alloy, and changes therein, the electromotive force generated is partially cancelled by a "bucking voltage" and a residual difference is measured by a recording instrument thereby allowing variations to be ascertained on a magnified scale.

In actual application of the Eding disclosure in commercial practice, a number of additional problems have been encountered. These problems include both disadvantages or deficiencies of a chemical and of a mechanical nature. The several factors giving rise to these problems are cited below. These factors are described with reference to the manufacture of the sodium alloys of lead, but it will be understood that similar conditions of varying degree will be found in substantially all installations.

Temperature shock—a change of as much as 100 to 200° C. is encountered in commercial operation, and in addition, on initial insertion of a new electrode in operating position, an initial thermal shock of approximately 350° C. is encountered in the case of conventional sodium lead alloys.

Mechanical shock—in the manufacture of the alloys of lead, large quantities, of the order of many thousands of pounds, of the alloy components are mixed in a single vessel. This is accomplished by rapid stirring of this relatively dense system. The sweeping action of dense high temperature liquid past a stationary object is responsible for definite mechanical strains. In addition, small pieces of tramp iron are frequently encountered in commercial system. These pieces, although of somewhat higher density than the alloy itself, are swept around by the moving liquid and can strike against stationary instrument installations within the alloy system. Such shocks can very easily break the electrode capsules.

Chemical attack—in non-ferrous alloy systems having a reactive metal component, the surface of the molten alloy is covered with at least a small amount of impurities. Usually, these are compounds of one of the components of the alloy. In the case of the sodium lead alloys, for example, the impurities would be sodium oxide and hydroxide. These materials attack vitreous materials quite readily and can be the cause of premature failure. It is therefore important to prevent undue contact between a glass electrode capsule and these impurities, as the chemical attack is aggravated by stirring action.

Size requirements—in commercial operations, the quantity of alloy in a batch to be analyzed may vary greatly, resulting in a change in level of three or four feet. It is also highly desirable that the electrode for analysis be inserted from a position above the alloy level, as otherwise it would not be possible to replace defective elements during processing operations. These dual conditions require that the electrode capsule, and hence auxiliary apparatus, be quite lengthy with respect to the diameter. In addition, as indicated above, the assembly must be sturdy and able to withstand the mechanical shocks previously referred to.

Stability of operation—this requirement refers to the maintenance of a constant E. M. F. for a constant alloy composition. It has been found that, although a relatively stable E. M. F. is produced when the wire lead from the sodium specimen leaves the capsule at a point above the alloy surface, in commercial installations a further requirement exists, that is, that the point of sealing and exit of the wire from the capsule should be outside the vessel containing the non-ferrous alloy.

Ease of Installation—an additional highly desirable factor in commercial application is providing apparatus which is capable of easy and rapid installation into an operating system. This is desired not only for reasons of convenience, but because time spent in replacing apparatus in commercial equipment represents down time and consequently a production loss. A further variation of this factor is that the apparatus must be capable of being inserted into alloy charge maintained at operating conditions.

Resistance to breakage on shutdowns—in the early development of commercial application of the apparatus, it was found that merely the act of draining a charge from a vessel wherein alloy was being manufactured could be a cause of breakage of the glass capsule.

Accurate temperature compensation—a feature of the Eding et al. method is that the temperature of the alloy being analyzed has an effect on the E. M. F. which is an indicia of composition. Therefore, provision must be made for ascertaining the temperature at the point of analysis. In preferred embodiments of the Eding method, a temperature determining element is incorporated in a manner such that a temperature compensation is automatically applied. In all instances, however, it is necessary that the temperature used, or compensated for, should be that of the reference metal specimen and of the alloy immediately adjacent thereto. Accordingly, an important feature of preferred forms of the present invention is provision be made for a temperature measuring element which provides accurate indicia of the temperature of the reference metal specimen and the alloy sample to be analyzed.

From the above, it will be seen that an object of the present invention is to provide apparatus which makes it feasible to employ the Eding et al. method in commercial installations. More specifically, an object of the invention is to provide a guarded electrode capsule, for employment in the Eding method. A further specific object is to provide a guarded electrode capsule of the character described which resists successfully the attack of impurities of sodium upon the glass of the electrode capsule. A further object is to provide apparatus which not only protects the capsule electrode above mentioned from thermal and mechanical shock during manufacture of the alloy in normal conditions, but is resistant to thermal and mechanical shock associated with starting or stopping the process. Still another more specific object of certain embodiments is to provide an integrated assembly which provides an adequate gas and liquid tight seal when in use even under the most adverse situations wherein the capsule electrode would fail or be broken. Still another object is to provide apparatus which provides protection of a capsule electrode from highly reactive impurities associated with the non-ferrous alloys being manufactured. Another object is to provide an assembly including a capsule electrode and a temperature measuring thermocouple element. A further object is to provide such an assembly which is particularly compact and occupies only a minor portion of the operative space of a vessel wherein the alloy is to be manufactured and analyzed. Still another object is to provide apparatus for positioning the operative portions of an electrode and a reference metal specimen at a point in the alloy body being processed which consistently provides the most accurate indicia of the composition of the alloy.

Generally, the apparatus of the invention includes a glass capsule electrode of the Eding et al. type and a surrounding and approximately co-extensive metal guard for the capsule. By co-extensive is meant that the said guard projects into the operating space containing the alloy to be analyzed an approximately equivalent linear distance. In certain embodiments as hereafter described, the capsule extends an appreciable distance outside the boundary of said space and supplemental equipment is associated in that region. The said guard, which may be of any suitable metal resistant to the chemical action of the alloy to be analyzed is of generally tubular cross section and is usually cylindrical in form, except for a portion at the end adjacent the sodium metal specimen with the capsule. In this region a divergent cone section is supplied; the action of this section being described hereafter. The conical section diverges downwardly, or toward the end of the guard, so that a downwardly increasing annular space is provided at the end of the capsule. In the region adjacent the reference metal specimen within the capsule, a plurality of perforations or holes is provided in the guard. It has been found that the area of these perforations should be at least equivalent to one-third or more of the extended peripheral wall area of the capsule. This extended area may be greater, providing that adequate mechanical protection is provided for the capsule. Two-thirds of the extended area of the capsule wall (adjacent the reference specimen) represents a preferred upper limit. The diameter of the widest portion of the conical section with respect to the capsule diameter is not extremely critical, but is generally of such magnitude that no solid material can be swept up within the annular zone and strike the capsule. On the other hand, the diameter is such that there will be virtually no vertical stagnation or stratification of the alloy within said zone with respect to the alloy at the comparable level within the manufacturing or storage space. The purpose of the apertures or perforations described is to assure and further guarantee that this possible stratification or stagnation will not occur. It has been found that when the area of the said openings is below the indicated range, that the analysis as determined from the composition within the annular zone referred to is not necessarily representative of the alloy generally.

The above described guard extends to the boundary of the space within which the alloy is situated. In the case of highly reactive metals which must be blanketed with an inert gas, such a boundary is defined by a metal wall or cover. The guard, in effect, continues an aperture in the said wall of the space. In other instances, when the apparatus is being employed in the analysis of less reactive alloys, the boundary may be, in effect, merely the level of the top rim of the open vessel containing the alloy. In those instances wherein an inert gas atmosphere is provided, the said guard is securely mounted in a portion of the boundary. Said boundary portion is preferably removable, thus functioning as a closure for the alloy vessel as well as a support member for the guard and electrode capsule. In such cases provision may be made to prevent loss of gas through the said support member and its joints with the guard described.

Generally the guard with the exception of the perforations already discussed is of solid wall construction throughout its length in the operating space. However, for reasons hereafter defined, in many instances it is highly desirable to provide a small "vent" space for opening in the upper portion of the guard substantially adjacent to the boundary.

Figure 2:
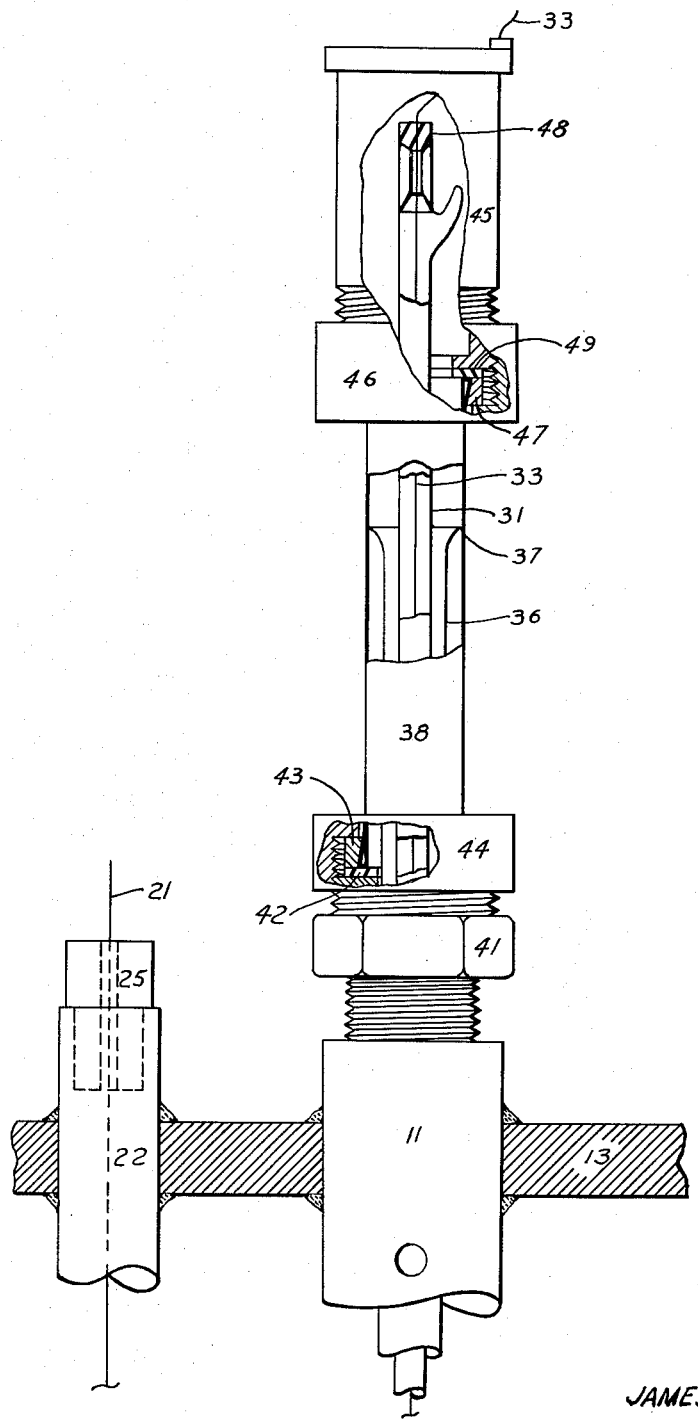
Figure 3:
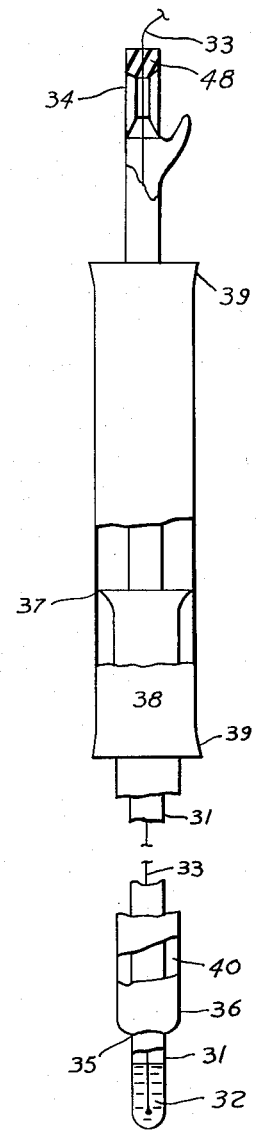

In a particular form of the apparatus of the invention, intended for use in the analysis of high reactive alloys, further specific provisions are made to prevent liquid or gas loss from the system generally. The details of such a specific embodiment and also of the broadest embodiment of the invention will be readily understood from the accompanying figures and detailed description hereafter. The figures include:

Figure 1 being a general assembly elevation drawing of the specific embodiment of the invention;

Figure 2 being an elevation, in larger proportions, of the upper portion of the embodiment illustrated generally by Figure 1;

Figure 3 being a view of an electrode capsule and integral appurtenances whose utility will be apparent in the description following.

Referring to Figure 1, the assembly is shown mounted in place in an opening 51 in the boundary wall or cover wall 52 of a vessel or pot employed for blending or manufacturing alloy. The principal parts of the assembly include a glass capsule 12, the tubular protective guard therefore 11, and a two conductor lead 21 terminating in a thermocouple 23. This element provides for obtaining a temperature accurately corresponding to the temperature of the reference metal specimen and the alloy adjacent thereto.

An adjacent guard tube 22 is, like the guard 11 for the capsule electrode 12, attached to a support member 13, which also functions as a closure of the opening 51 in the vessel. The guard tube 22 is mounted parallel to and is of substantially the same length as the guard tube 11 for the capsule. Aligning webs 17 are provided to provide alignment and mutual support to the guard tubes. The thermocouple leads 21 are positioned within the second guard tube 22. The guard tube 11 for the glass capsule includes a short conical section 14 which, for example, is several times in length the vertical portion of the capsule occupied by the reference metal specimen. Thus, in a typical situation the conical section extends for approximately one and one-half feet and the reference metal specimen occupies approximately one-third of a foot. The lower portion of the conical section 14 is pierced by a plurality of holes 15, the area of said holes or perforations being approximately one-half of the peripheral area of that portion of the conical section 14. At least one small vent hole 16 is provided near the upper portion of the guard tube for the capsule.

The glass capsule 12 extends as shown through the support member 13. In the embodiment illustrated appropriate means are provided above the support member 13 whereby a fully gas tight closure for the manufacturing space can be provided. The details of this portion of this assembly are illustrated more fully by Figure 2, described hereafter. Reference is first made to Figure 3 which is a view of a capsule assembly including a capsule proper, and protective and support means integrally associated with the capsule. As shown by Figure 3, the capsule assembly includes the capsule proper 12, which is a long glass tube containing at the lower end thereof a reference metal specimen 32 and having a wire 33, or an equivalent electrical conduit, extending throughout its length and making contact with the reference metal speciment 32. The wire passes through the upper end generally of the capsule proper 31 by means of a joint 34. Attached to the capsule proper 31 at a "ring joint" 35 is a sleeve or sheath 36 which is also, like the capsule proper 31, made of a suitable vitreous material resistant to the conditions of operation. The sleeve or sheath 36 is generally concentric with the capsule 31 and defines an annular space 40 which is closed at the bottom by the ring seal 35. The upper end of the sheath is generally near the upper end of the capsule and in turn attaches by means of an inside ring seal 37 to a support tube 38. The support tube 38 is preferably of relatively sturdy thick wall section of the standard commercial variety for process installations, fitted with standard cone sections 39 to allow mechanical and rigid fastening to metal devices hereafter described.

Returning to Figure 2, the glass capsule assembly of Figure 3 is shown in place with respect to the protective guard 11 and the supporting member 13. The upper end of the protective guard 11 passes through the support member 13 and is welded thereto and is provided with threads for a threaded fitting 41 which makes a tight connection thereto. The upper surface of the threaded fitting provides a solid seat for a gasket 42 upon which the lower end of the support tube 38 is firmly mounted. A collar 43, slidably mounted on the support tube 38, and having its inside surface corresponding generally to the conical member of the support tube 38, engages said cone support section 39 under the influence of a threaded follower 44 by means of which a pressure tight engagement of the support tube against the threaded fitting 41 is obtained.

At the upper end of the support tube 38 a similar connection is made to an enclosing cap. The cap comprises a cylindrical chamber 45 having threads at the lower end for engaging a threaded follower 46 which achieves a pressure type connection between a shoulder on the interior of the chamber 45 and the support tube 38 by a ring 47 bearing on the conical section 39 of the support tube and thereby compressing a gasket 49. The upper terminus 34, the most fragile portion of the capsule proper 31, thus is enclosed within the cap tube 45. The wire extending through the capsule terminus 34, by a Sauereisen cement seal 48, passes through the upper boundary of the cap tube 45 by a pressure tight connection. A further safeguard for commercial installations may be provided by a cylindrical metal enclosure, or cap 19 which surrounds the projecting portions of the capsule assembly and the thermocouple connections (see Figure 1).

The utility of the above described assembly will be understood by consideration of its operation as described below with reference to Figure 1. The assembly is inserted through the opening 51 usually at a time when a level of material in the manufacturing vessel is at a low point, for example as indicated by the level A. The assembly is bolted in place by the studs and bolts 18. Upon insertion of the end of the apparatus into the alloy a minor quantity of the impurity on the alloy surface is introduced into the annular space defined by the capsule 12 and the protector tube cone 14. However, this contaminating film of impurity is pushed up into a point beyond the zone wherein the reference metal specimen is situated. As the alloy supply is increased by addition of more individual components, the level of the alloy rises in the vessel tube in ultimate position approaching the top for example as at B. Because of the existence of the vent hole 16 the level of the alloy within the protective tube 11 is also free to rise at almost the same rate. The size of vent holes is such that they represent no appreciable bar to relatively free flow upward or downward to follow the level of the main body of the alloy in the vessel. However, the size of these vents is still small enough to serve an additional useful function. Thus, even though a continuous supply of inert gas is continuously let into the space of the vessel above the alloy, there will be virtually no circulation above the alloy within the protective guard tube 11, and as a result there will be no appreciable increase in impurities owing to additional contaminant impurities introduced in the inert gas itself. Accordingly, since the rate of the formation of impurity within the tube is appreciably less than is possible in the main body of the alloy, the corrosive attack upon the glass of the capsule envelope or sheath 36 is minimized and longer life and actual service are provided.

Upon termination of operation for clean out of equipment, or for discharging a single batch or starting a new batch, the alloy level drops again for example from B to about A and the level of the alloy within the tube 11 also drops. In previous practice this operation introduced a definite complicating factor in the zone adjacent the reference metal specimen (that is, at the lower end of the capsule 12). In this zone, when the alloy level is low, as described, a strong tendency exists to freeze the alloy in the annular space defined by the capsule and the protective guard. Unfortunately, this freezing resulted in breakage of the glass envelope or capsule. Surprisingly, however, it has been discovered that the presence of a downwardly divergent conical section virtually eliminates this breaking tendency although the heat transmission characteristics are not significantly altered. It is believed that even though freezing does occur, the solid particles tend to sink in the liquid phase and thus avoid compressing and breaking the glass.

The precise dimensions of the conical section of the guard tube are not highly critical. However, the vertical dimension should be greater than the vertical portion of the capsule occupied by the reference metal specimen, and preferably at least twice this length. The angle of divergence similarly may be varied, a preferred range being from about 5 to 10° total. As previously mentioned, the size of the annular space at the lowermost point should not be so great that tramp iron particles in the alloy body can be projected up and strike the capsule, which should be substantially co-extensive with the guard tube. It is found that, in the ordinary range of sizes of capsules employed, the width of the annular zone, at its widest lowermost point, should not exceed about three inches, the preferred range being from one and one-half to two and one-half inches.

As previously described the sole function of the thermocouple lead 21 is to provide a temperature responsive E. M. F. corresponding generally to the temperature at which the alloy reference specimen is positioned. Accordingly, the thermocouple 23 terminating the lead 21 is positioned vertically at about the center or near the center of the vertical position of the reference metal specimen in the capsule 12. The thermocouple leads 21 are electrically isolated from the guard tube 22 by means of suitable porcelain insulators 24, 25. The point of transmission of the wire elements 21 to the exterior of the assembly is not necessarily pressure tight because a cap 27 at the bottom of the guard tube 22 prevents leaks.

The lead wire 33 from the capsule assembly is connected, through a potential measuring device, to a second wire or electrical conduit 26 which provides for electrical connection with the body of the alloy to be analyzed. It has been found that such connection need not be directly to a point adjacent the reference metal specimen, the entire body of the alloy being at the same relative electrical potential. Thus, the wire 40 suitably connects at the stud and nut fastening 18 for securing the base member 13 in position.

Having fully described the apparatus of my invention and the variations thereof, what is desired to claim is:

I claim:

1. In an assembly for alloy analysis including an elongated capsule normally projecting below the surface of a fused alloy and containing a metal reference specimen thereby positioned below said surface, the improvement comprising an open ended guard tube of larger internal diameter than and surrounding at least the portion of the capsule normally below the alloy surface, and means for supporting the guard tube, the guard tube having a portion adjacent the end of the capsule having divergent walls, said divergent wall portion having apertures therein generally adjacent the reference metal specimen and corresponding to at least about one-third the extended area of the capsule wall containing the reference metal specimen.

2. A guarded electrode assembly for substantially vertical location in a vessel containing fused non-ferrous alloy, comprising an elongated glass capsule, a charge of alkali metal in the lower portion of the capsule, an annular glass sheath surrounding a major portion of the capsule and peripherally sealed thereto at a point adjacent the alkali metal charge, a relatively short pressure resistant glass pipe surrounding part of the upper portion of said sheath and sealed to the upper end of said sheath, and a metal protector surrounding said electrode comprising a tubular shield approximately equal in length to the capsule less the said pressure resistant pipe, means for aligning and retaining said protector, the protector including a downwardly diverging conical section at the lower portion thereof, said conical section being pierced by a plurality of openings, the openings being equal in area to at least about one-third of the extended area of the portion of the capsule occupied by the alkali metal specimen.

3. A cell assembly for use in analysis of a non-ferrous alloy and adaptable for rapid insertion into a vessel containing fused alloy, the assembly including an elongated glass capsule electrode containing an alkali metal specimen, comprising a supporting member plate adapted for forming a closure in the vessel, said member having an aperture for passage of the electrode, and a tubular open ended channel attached to said member and forming an extended passage and guard for the electrode, the said channel for the electrode terminating in a conical section divergent away from the said member, said conical section being perforated by a plurality of openings having an area equal to from about one-third to two-thirds of the extended capsule wall area occupied by the alkali metal specimen.

4. An assembly for use in analysis of a fused non-ferrous alloy by measuring the electrical potential difference between the alloy and an alkali metal reference specimen while concurrently determining the temperature of the reference metal and the fused alloy immediately adjacent thereto and adapted for rapid insertion in a vessel for holding fused alloy and comprising a supporting member plate for forming a closure in the vessel, an elongated electrode capsule, said supporting member having a first aperture for insertion of said elongated electrode capsule, and a tubular open ended channel attached to said member and forming an extension of said first aperture, the said channel terminating in a conical section adjacent the end of the said capsule, the conical section being perforated by a plurality of openings having an area equal to from about one-third to about two-thirds of the extended wall area of the portion of the capsule occupied by the alkali metal specimen, the supporting member having also a second aperture for insertion of a temperature measuring element, and a tubular well attached to said member, said well being substantially parallel and co-extensive with the said channel and attached thereto at intervals along its length to form a relatively rigid structure.

References Cited in the file of this patent

UNITED STATES PATENTS

| | | |
|---|---|---|
| 1,592,979 | Keeler | July 20, 1926 |
| 2,505,936 | Behn | May 2, 1950 |
| 2,665,412 | Eding et al. | Jan. 5, 1954 |